Feb. 1, 1944.     C. A. TOCE ET AL     2,340,442
AUTOMATIC METER
Filed Feb. 9, 1940     4 Sheets-Sheet 1
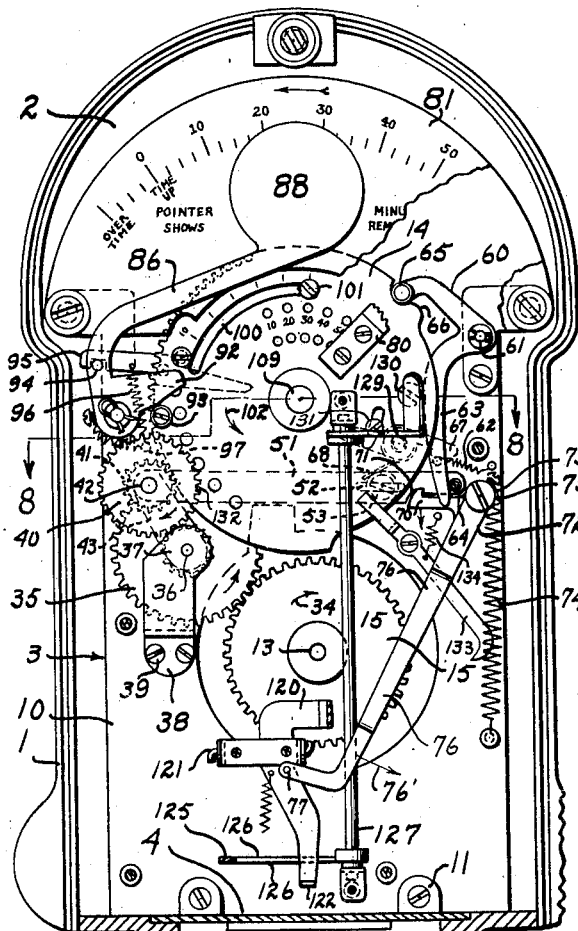
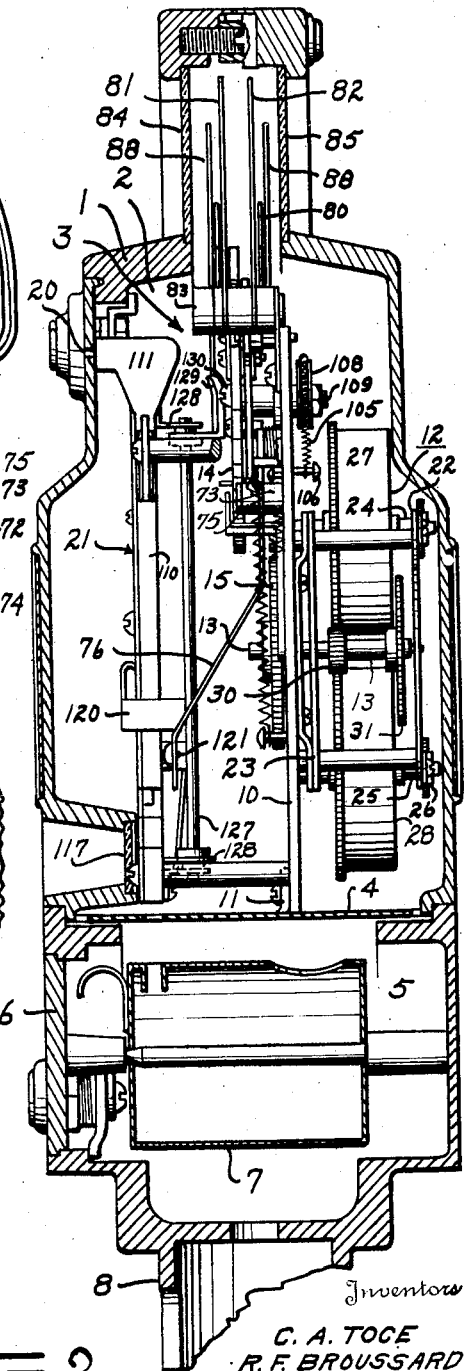
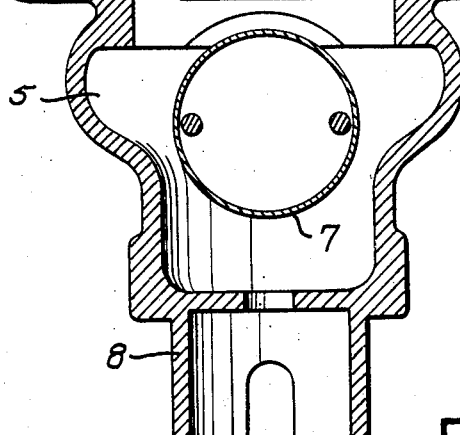
Fig. 1.     Fig. 2.
Inventors
C. A. TOCE
R. F. BROUSSARD
By Jesse P. Stone
Lester B. Clark
Attorneys Feb. 1, 1944. C. A. TOCE ET AL 2,340,442
AUTOMATIC METER
Filed Feb. 9, 1940 4 Sheets-Sheet 2

Inventors
C. A. TOCE
R. F. BROUSSARD

By Jesse R. Stone
Lester D. Clark Attorneys

Feb. 1, 1944.   C. A. TOCE ET AL   2,340,442
AUTOMATIC METER
Filed Feb. 9, 1940   4 Sheets-Sheet 3
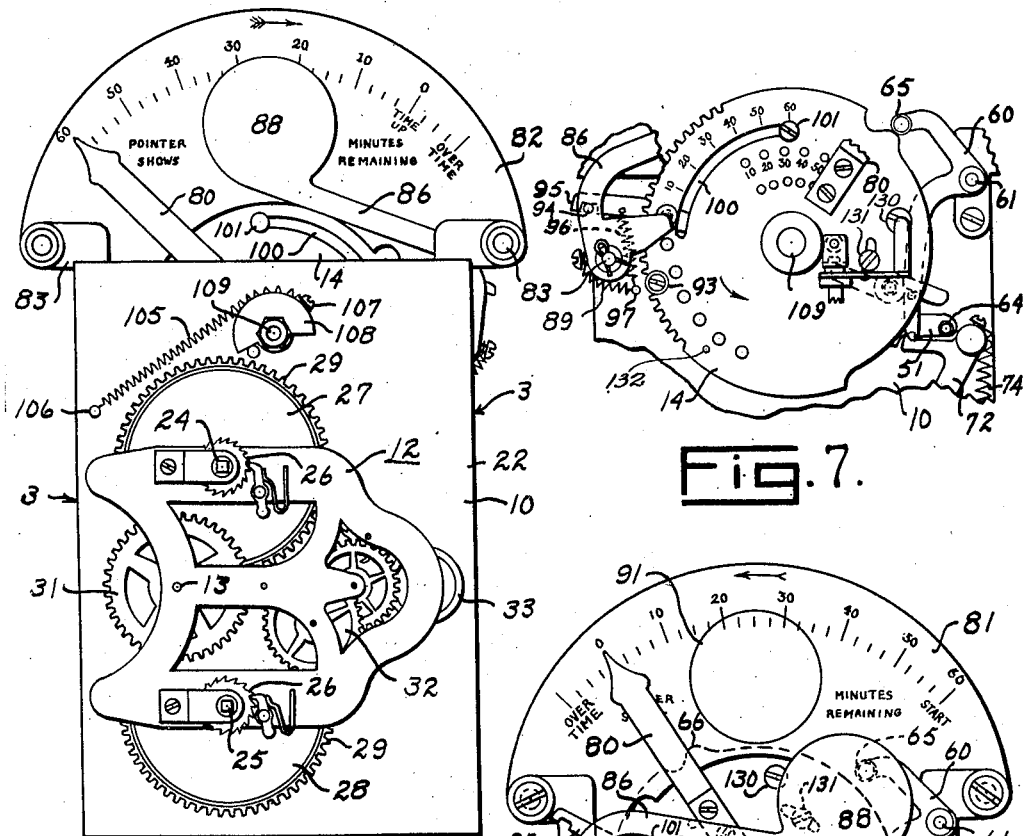
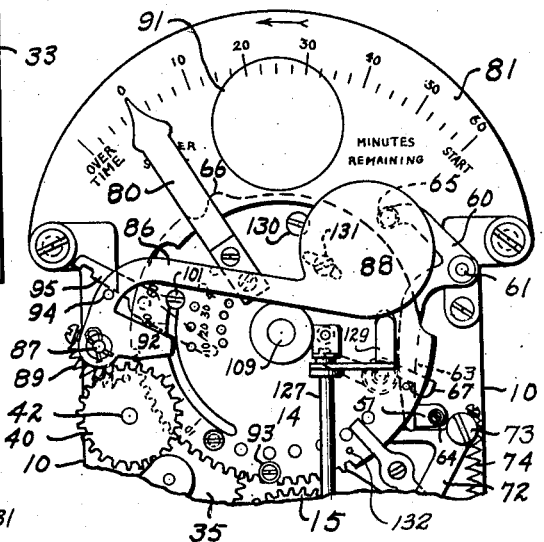
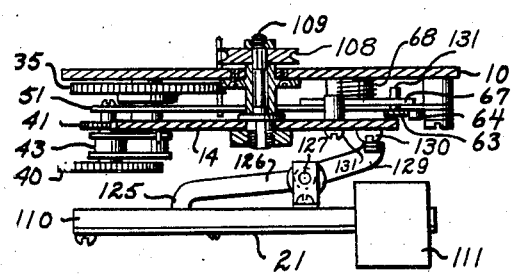
Inventors
C. A TOCE
R. F. BROUSSARD
By Jesse R. Stone
Lister D. Clark
Attorneys Inventors
C. A. TOCE
R. F. BROUSSARD Patented Feb. 1, 1944

2,340,442

UNITED STATES PATENT OFFICE 2,340,442

AUTOMATIC METER

Charles A. Toce and Robert F. Broussard, Houston, Tex., assignors, by direct and mesne assignments, to Vehicular Parking, Ltd., Newark, N. J., a corporation of Delaware Application February 9, 1940, Serial No. 318,017

5 Claims. (Cl. 161—15)

This invention relates to a meter for measuring the time interval elapsing from the initiated actuation by a coin or suitable token and more particularly relates to a device of this type which is completely automatic in operation upon the deposit of a proper coin or token.

The principal object of the invention is to provide a device of the class described in which it is necessary only to deposit a coin or token to establish operation thereof.

Another object is to provide a device in which the time interval indicator is constantly urged toward a starting position and is permitted to move to the starting or initial position upon the deposit of the coin or token.

Still another object is to provide a device of the class described in which the timing mechanism moves a time interval indicator over a dial from an initial or zero position after operation of the mechanism is initiated.

Another object is to provide a mechanism which may be adjusted to operate for any desired time interval upon the insertion of a coin or token.

Another object is to provide a device of the class described in which the operation of the timing mechanism is terminated after a predetermined time interval has elapsed.

A more specific object is to provide a timing device in which the time indicator is itself connected and is returned to an initial indicating position upon the deposit of a coin.

The foregoing are primary objects and, together with other objects, will be apparent from the following description of a preferred embodiment of the invention taken in connection with the drawings in which:

Fig. 1 is a front elevational view of the device of the invention with the housing front and coin receiving unit removed, the base of the housing being shown in vertical section;

Fig. 2 is a side elevation taken from the right of Fig. 1, the housing being shown in section, the working mechanism in elevation, and the coin receiving unit in position;

Fig. 5 is a rear elevation similar to that shown in Fig. 3;

Fig. 6 is a detail including the actuating mechanism whereby a signal of elapsed time is displayed.

Fig. 7 is a detail similar to that shown in Fig. 6 but illustrating the relative position of parts before the signaling mechanism has been actuated;

Fig. 8 is a plan view in section on line 8—8 of Fig. 1;

Figure 3:
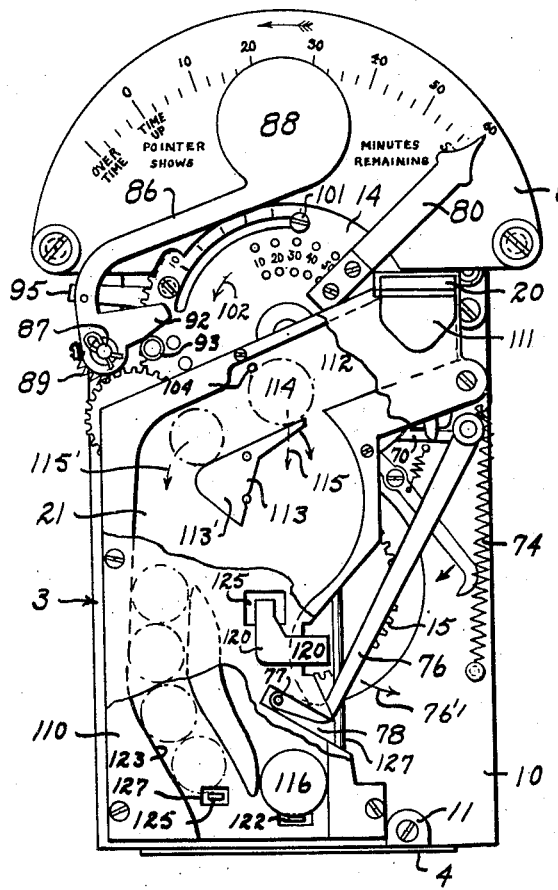
Fig. 3 is a front elevational view of the operating mechanism of the device, a portion of the front face of the coin receiving unit being cut away to more clearly disclose operating details.

In the drawings the reference character 1 indicates a suitable box like housing having an upper chamber 2 within which the meter mechanism generally indicated at 3 is secured. Beneath the floor 4 of the housing 1 is a separate chamber 5 having a door 6 for access to a coin receiving chamber 7 removably fixed therein. The lower end of the housing 6 is reduced at 8 to form a downwardly extending tubular portion by means of which the mechanism may be secured to a suitable support such as a tubular pillar or post as is well known in the art.

The meter mechanism 3 comprises a base or mounting plate 10 which is attached to ears 11 within the housing and it is on this plate that the principal elements of the meter mechanism are mounted. These elements include generally a timing mechanism 12 which drives the main shaft 13 which, in turn, drives a time indicating mechanism thru a gear wheel 15 on the front side of the plate 10. The time indicating mechanism includes a disc 14 and associated elements as will be more fully described. This mechanism is set in operation by the deposit of a proper coin or token thru the slot 20 in the housing and thence into a coin receiving unit 21.

As best shown in Fig. 5 the timing mechanism 12 is secured to the rear of the plate 10 and comprises spaced frame members 22 and 23 in which are mounted upper and lower shafts 24 and 25 provided with winding ratchets 26. As is well known in the art the opposite ends of a spiral spring are attached respectively to the shafts and the interior of spring barrels 27 and 28 which are provided with toothed portions 29 engaging a pinion 30 on the drive shaft 13. By means of this construction the energy delivered by both of the springs within the spring barrels 27 and 28 is instrumental in driving the remainder of the timing mechanism and the driven meter elements hereinafter more fully described.

The timing mechanism, as already indicated, also includes the gear wheel 31 which is fixed upon the shaft 13 and which is operatively connected thru a gear train 32 terminating in an escapement which cooperates with a balance wheel 33 whereupon timed operation of the mechanism is effected.

On the side of the plate 10 opposite the timing mechanism 12 just described is the gear wheel 15 fixed upon the shaft 13. This gear wheel is rotated in the direction indicated by the arrow 34 (Fig. 1) and drives intermeshing gear 35 and pinion 37 integral therewith, such gear and pinion being on shaft 36 mounted in the plate 10 and a bracket 38 secured thereto by means of the screws 39. The pinion 37 meshes with composite gear 40 which includes a pinion 41 mounted on shaft 42 in a yoke 43 which is swingably mounted upon the shaft 36. The pinion 41 meshes with complementary teeth on the periphery of a disc 14 of the time indicating mechanism.

The angular position of the yoke 43 upon the shaft 36 is determined by a latch member 51 through which the shaft 42 passes, such latch member being slotted at 52 to slidably receive a post 53 which assures rectilinear movement of this member and also determines its limit of movement. This latch member and the associated yoke and gears are normally urged to the right by means of a bell crank lever 60 pivoted upon a pin 61 and having a tension spring 62 which tends to move the lower end of the arm 63 to the right against roller 64 mounted on the latch member 51. A roller 65 is mounted on the end of the other arm of the bell crank lever 60 and engages the periphery of the disc 14. It is to be noted that the yoke 43 extends upwardly and to the left as shown in Fig. 1 and hence tends to move to the left by the force of gravity acting thereon. The spring 62 is sufficiently weak that the force thereof is exceeded by the force of gravity tending to move the yoke 43 and the associated latch member 51 against the effort exerted by the spring. It is believed apparent that by means of this construction the latch member 51 when released for movement as hereafter described can move toward the left under gravity and permit disengagement of the pinion 41 with the teeth on the periphery of the disc 14 only when the tension of the spring 62 is overcome as by the roller 65 riding upon the elevated surface 66 of the disc 14.

Normally the latch member 51 is latched in position by means of the pawl arm 70 having a projection to engage within the notch 71 in the latch member. This pawl arm is one of the arms of the bell crank lever generally designated as 72 pivotally mounted upon a post 73 and constantly urged to rotate in a clockwise direction by means of a spring 74 attached to the cylindrical surface 75 of the bell crank lever about the axis of movement thereof. The other arm 76 of the bell crank lever 72 extends diagonally downwardly and terminates in a pin 77 which extends at right angles therefrom and enters a slot 78 in the coin passage of the coin receiving unit 21.

An important feature of the construction resides in the disc 14 and associated elements of the time indicating mechanism. As already indicated this disc is rotated thru a limited angle by the pinion 41 which is driven from the timing mechanism 12 and which engages peripheral teeth on the disc 14. This disc carries pointers 80 on its opposite sides to travel over the outer faces of time indicating scales 81 and 82 mounted on ears 83 and so positioned relative to the windows 84 and 85 in the housing 1 that the position of the pointers over the scales may at all times be observed.

Figure 4:
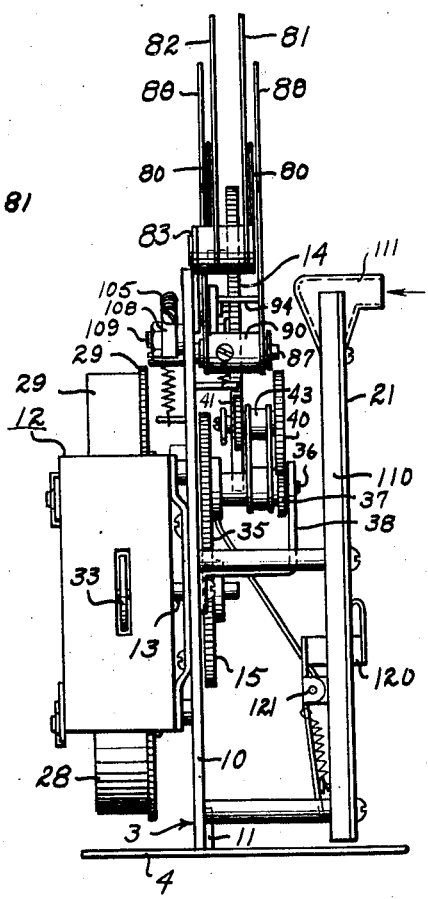
Fig. 4 is a side elevational view taken from the left in Fig. 3.
Figure 9:
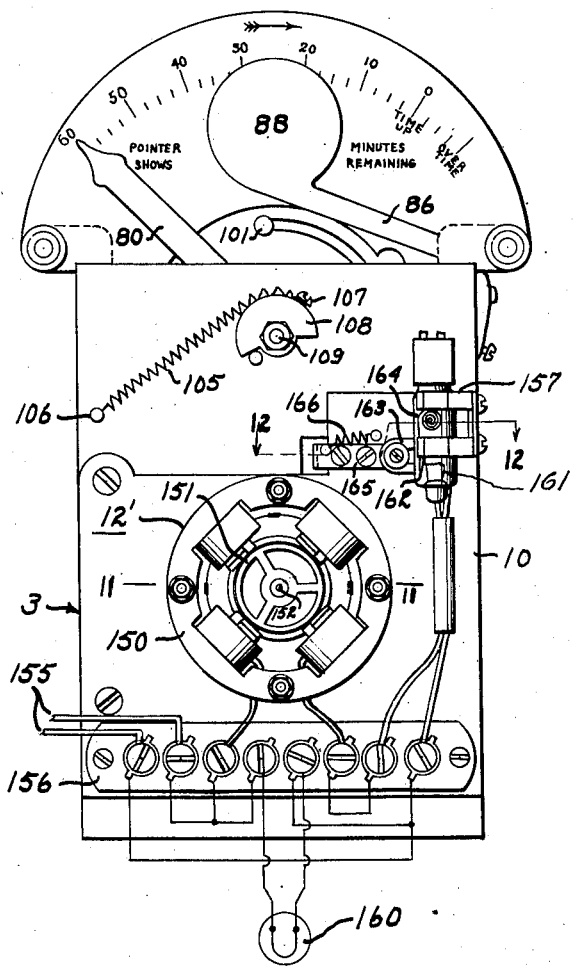
Fig. 9 is a view similar to that shown in Fig. 5 but illustrating the manner of using an electric timing mechanism and switching means therefor.
Figure 10:
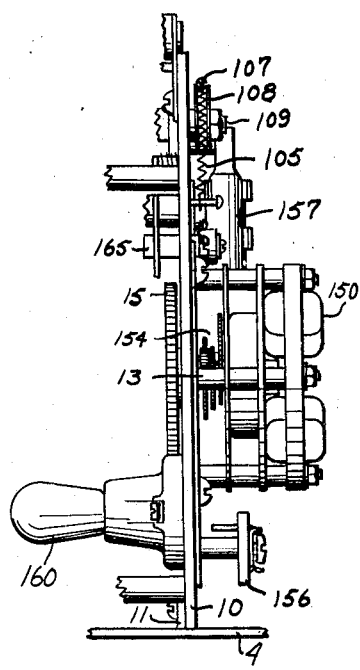
Fig. 10 is a partial elevational view taken from the left in Fig. 9.

A pair of spaced interconnected flags 86 are pivotally mounted upon a pivot post 87 and have circular enlargements 88 at their outer ends. A portion of the weight of these flags is counterbalanced by means of a spring 89 attached to the periphery of a tubular member 90 (Fig. 4) which interconnects the flags. The enlargements 88 are preferably green in color and serve, when in the position shown in Figs. 1 and 3, to cover a red signal 91 (Fig. 6) on the scales 81 and 82.

One of the flags 86 has an inwardly projecting ear 92 which is engageable by a pin 93 on the disc 14 as the disc rotates in a clockwise direction, as viewed in Fig. 1, to return the flags to their initial or starting position. When the flags 86 are lifted to their uppermost position, a rod 94 extending therebetween is engaged by a notch in a pivoted arm 95 which tends to rotate in a counterclockwise direction by the tension of a spring 96 of which the opposite end is attached to a fixed pin 97 to which the spring 89 is also attached. The disc 14 is provided with a slot 100 in which a post 101 is adjustably secured and which projects rearwardly from the disc.

As the disc rotates in a counterclockwise direction as indicated by the arrow 102, when the device is in operation, this post engages the inner end of the arm 95 whereby the outer end is lifted and the flags 86 are released to fall by gravity and expose the colored discs 91 on the scales 81 and 82.

Adjustment in the position of the pin 101 determines the time interval before which the flag assembly will be actuated thereby. In order that such time interval will coincide with the time indicated by the pointers 80, the position of these pointers may be changed accordingly by securing the pointers in the proper openings in the disc 14, such openings being identified by the numerals 10—50 which indicate the timing interval for the respective settings.

As already indicated the disc 14 is driven as indicated by the arrow 102 by the timing mechanism 12. Such rotation of the disc 102 elongates a spring 105 which extends between an anchor pin 106 on the plate 10 and a screw 107 on the periphery of the circular segment 108 on the shaft 109 to which the disc 14 is attached, (Fig. 5). There is therefore a constant tendency for the disc 14 to be rotated in a counterclockwise direction when viewed as in Fig. 1 until a limit of movement is reached as determined by the engagement of the projection 93 with the ear 92 on flag 86.

The coin receiving unit 21 is mounted on pillars which extend forwardly from the plate 10 and is of relatively conventional construction. It comprises a plate 110 provided with a head 111 having a coin receiving slot into which the coin passes from the opening 20 in the housing 1. The internal passage in the head 1 is so contoured that the inserted coin moves under gravity into a passage 112 (Fig. 3) where the coin 114, of sufficient diameter to strike the pin 104, moves upon a tiltable arm 113 provided with a counterbalance 113' and causes tilting of the arm so that the coin will follow the path indicated by the arrow 115.

It may be assumed that a previously deposited coin 116 is held in view in front of the window 117 in the housing 1 by a projection 122 on the lever 120. This lever is pivoted at 121 on the rear of the plate 110 and has an upper arm which extends to the forward face of the coin receiving unit 21 where such arm projects diagonally downward thru an opening 125 and into the path of the coin 114. During the passage of the coin 114, the arm 120 is moved to withdraw the projection 122 and to release the coin 116. During its descent the coin 114 engages pin 77 and moves the arm 76 to the right to initiate operation of the device as will be more fully described. During such movement of the coin the projection 122 will return to its original position and the coin 114 will thereafter assume the position of the coin 116 shown in Fig. 3 and will remain in such position during the succeeding period of operation of the device.

The coin receiving unit 21 is also designed to effect operation of the meter when a predetermined number of smaller coins are deposited. For example, the meter may be operated by a nickel 114 or by five pennies which are of such diameter and weight that they follow the path indicated by the arrow 115' and enter passage 123 where four such coins accumulate. The fifth coin will, however move into the passage past the end of the arm 120 and engage the pin 77 to bring about operation of the device in the manner just described when using the coin 114.

The end 125 of an arm 126 projects thru an opening 127 in the plate 110 and supports the lowermost of the coins in the passage 123 closely adjacent the window 117. The opposite end of the arm 126 is attached to a rod 127 pivoted in ears 128 on the rear of the plate 110. Another arm 129 extends outwardly from the rod 127 and is adapted to be engaged by the head of a screw 130 fixed in the disc 14. Such engagement is effective to rock the rod 127 and to release the coins or tokens in the passage 123 whereby such coins are permitted to fall by gravity into the chamber 7 when the device is set in operation by the deposit of a coin 114 or a sufficient number of coins or tokens that one moves into the passage to strike pin 77 on the bell crank lever 76.

For further constructional features attention is now directed to the manner of operation of the illustrated embodiment of the invention. For the sake of illustration it will be assumed that the device has been in use and that the pointers 80 have reached or passed beyond the zero point on the scales 81 and 82. The flags 86 have therefore been tripped by the engagement of the lug 101 with the inner end of the arm 95 and the elements of the device have assumed the relative positions shown in Fig. 6. The preceding coin 116 is then retained in the position shown in Fig. 3.

If a coin 114 or a proper number of smaller coins are deposited in the slot 20 of the housing such coin or coins will cause the arm 76 to move as indicated by the arrow 76' so that the arm 70 will be released from the notch 71 in the latch member 51.

During the previous operation the roller 65 passed over the elevated peripheral portion 66 of the disc 14, whereby the arm 63 was moved to the left as viewed in Figs. 1 and 6 against the tension of the spring 62. At that time the pin to which the spring 62 is attached moved beneath a pawl 67 which is pivotally mounted upon the plate 10 and urged by a spring 68 to engage the pin on the arm 63. Hence the latch member 51 is held only by the engagement of the arm 70 therewith when the assumed successive operation is initiated.

Release of the arm 70 from the notch 71 in the latch member 51 permits such member to move to the left so that the cooperating teeth of the pinion 41 and the disc 14 are disengaged. The disc 14 then moves in a clockwise direction as viewed in Fig. 1 under the influence of the spring 105 attached to the rear end of the shaft 109. During such movement the lug 93 engages ear 92 on the flag assembly to lift the flags to a position to obscure the red discs 91 on the scales 81 and 82.

Another lug 131 including a screw which passes through a slot in the disc 14 whereby the lug is secured in a desired position, and engages the inner end of the pawl 67 and releases the arm 63 of the bell crank lever 60 whereupon the spring 62 becomes effective to move the latch member 51 and reconnect the timing mechanism 12 to the disc 14 of the time interval indicator. Thereafter the mechanism is operated by the energy from the timing mechanism 12 to cause the pointers 80 to move across the scales 81 and 82 and indicate the interval of time remaining until it is necessary to deposit a succeeding coin thru the slot 20.

Attention is directed to the fact that as the time interval indicator returns to starting position as just described the screw head 130 engages the end of the arm 129 whereby the lower arm 126 on the rod 127 is caused to rock and withdraw the projection 125 from within the opening 127 so that the coins retained within the passage 123 are permitted to move under gravity into the coin receiving chamber 7 together with the coin retained by the projection 122.

When the pointers 80 reach the overtime limit a pin 132 on the disc 14 engages the upper end of a lever 133 so that such lever is moved against the tension of spring 134 and engages the gear wheel 15 to stop the timing mechanism until operation of the meter is again initiated.

An alternative embodiment of the invention is illustrated in Figs. 9 to 12 inclusive wherein the timing mechanism 12 is replaced by an electrically actuated timing mechanism indicated at 12'. This construction comprises a stator 150 within which a rotor 151 is positioned upon a shaft 152. This shaft is provided with a pinion 153 on the end thereof which drives a gear train 154 to rotate the drive shaft 13 in the manner already described. Electrical energy is supplied to the mechanism by means of the conductors 155 leading to the terminal board 156 thru which a connection is made in series thru a mercury switch 157 to the windings of the stator 150. Connection is also made from the conductors 155 to a lamp 160 provided within the meter housing so that the illumination therefrom will make the dials 81 and 82 visible at all times.

The mercury switch 157 is of a conventional construction in which a small armature 162 is attracted by a magnet 163 against the force exerted by a small spiral spring 164 to keep the circuit closed. One of the energized conductors is connected to the spring 164 and the armature 162 carries a contact extension 161 which contacts mercury in the lower end of a switch tube when the armature is held in the position shown in Fig. 9. The magnet 163 is mounted upon a bar 165 slidably mounted upon the plate to which the unit 12' is attached. This bar is constantly urged by means of a spring toward a position whereby the armature 162 is attracted to the position shown and the switch is closed.

Figure 12:
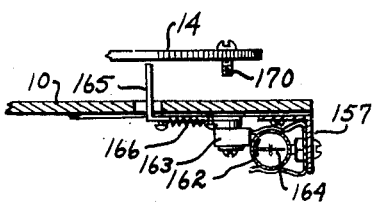
Fig. 12 is a sectional view taken on line 12—12 in Fig. 9.
Figure 11:
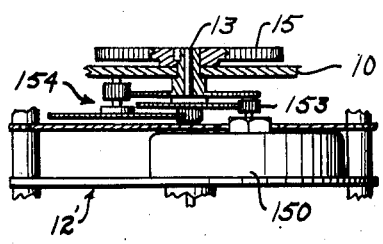
Fig. 11 is a sectional view taken on line 11—11 in Fig. 9.

As clearly shown in Fig. 12 one end of the bar 165 projects rearwardly and is adapted to be engaged by a screw 170 in the disc 14, such engagement taking place as the pointer 80 reaches the limit of travel. Driving movement thus effected moves the magnet 163 to the left, Figs. 9 and 12, so that the magnetic influence upon the armature 162 is decreased and the spring 164 moves the armature to the right as appearing in Fig. 9, so that the conductor 161 moves from engagement with the mercury to open the circuit and stop the timing mechanism 12'. It is believed apparent that, by means of this construction, the timing mechanism will be deenergized as soon as the time interval has elapsed and the device will thereafter remain inactive until the subsequent deposit of a proper coin or token.

What is claimed is:

1. In a device of the class described, a timing mechanism, a time interval indicator including a disc to be rotated, means normally urging said disc towards an initial position, a releasable gear connection between said timing mechanism and said disc, said connection including a gear movable under gravity from driving engagement with the time interval indicator and latch means normally holding the gear against gravity so that the time interval indicator is driven by the timing mechanism, coin operated means for releasing said latch means whereby said disc is rotated by said first mentioned means, and means operable by the rotation of said disc for reestablishing said gear connection.

2. In a device of the class described, a drive wheel operated at a timed rate, an indicator disc having a segment of driving teeth thereon, a gear operatively connected to said drive wheel and movable toward and from said driving teeth, latch means normally holding said gear with its teeth in engagement with the driving teeth whereby the disc is driven at a timed rate, means for releasing said latch means so that said disc is returnable to an initial indicating position, and means operable by the rotation of said disc to such position for reengaging the gear and teeth.

3. In a device of the class described, a timing mechanism, a time interval indicating means including a disc to be rotated by the timing mechanism, said disc having a segment of driving teeth thereon, a gear wheel operably connected to said timing mechanism and mounted to move under gravity from engagement with said driving teeth, latch means normally holding the gear wheel in driving engagement with the driving teeth, coin operated means adapted to release said latch means whereby said gear moves under gravity from driving engagement with the disc, a spring adapted to rotate said disc in a direction opposite to the direction of rotation by the timing mechanism, means operable by the rotation of the disc for reengaging the gear and teeth when the disc rotates to a predetermined position under the influence of said spring, and additional means operable after rotation of the disc during a predetermined time interval for terminating the operation of the timing mechanism.

4. In a device of the class described, a timing mechanism, a time interval indicator including a disc having a segment of driving teeth thereon, a gear operatively connected to said timing mechanism and movable under gravity from engagement with the driving teeth on the disc, latch means holding said gear in engagement with said segment of driving teeth when the device is in operation, means operable by a coin for actuating said holding means for releasing said latch to permit said gear to move from engagement with said disc, and means operable by movement of the disc to initial position for reengaging the gear and teeth whereby the indicator thereafter indicates elapsed time after the coin is deposited.

5. In a device of the class described, a time mechanism, a time interval indicator including a disc having a segment of driving teeth thereon, means urging said indicator to an initial position, a gear operatively connected to said timing mechanism and movable under gravity from engagement with the driving teeth on the disc, latch means normally holding said gear in engagement with said segment of driving teeth when the device is in operation, means operable by a coin for actuating said holding means for releasing said latch to permit said gear to move from engagement with said disc whereby said first mentioned means may move the indicator to an initial position, latch means operable by movement of the disc to initial position for reengaging the gear and teeth whereby the indicator is driven and thereafter indicates elapsed time after the coil is deposited, and means operable by said disc to stop the timing mechanism after a predetermined time interval has elapsed.

CHARLES A. TOCE.
ROBERT F. BROUSSARD.